(12) United States Patent
Weston et al.

(10) Patent No.: US 7,404,543 B2
(45) Date of Patent: Jul. 29, 2008

(54) SLOW CLOSING ACTUATOR AND VALVE

(75) Inventors: Richard R. Weston, Nazareth, PA (US); Terrance M. Carom, Schnecksville, PA (US)

(73) Assignee: Victaulic Company, Easton, PA (US)

( * ) Notice: Subject to any disclaimer, the term of this patent is extended or adjusted under 35 U.S.C. 154(b) by 126 days.

(21) Appl. No.: 11/519,293

(22) Filed: Sep. 12, 2006

(65) Prior Publication Data

US 2008/0061261 A1    Mar. 13, 2008

(51) Int. Cl.
*F16K 1/22*    (2006.01)

(52) U.S. Cl. .................. 251/305; 251/286; 251/288; 251/304

(58) Field of Classification Search ............... 251/284, 251/286, 288, 304–315.16
See application file for complete search history.

(56) References Cited

U.S. PATENT DOCUMENTS

| | | | | |
|---|---|---|---|---|
| 23,902 | A * | 5/1859 | Hodgson .................. 137/259 |
| 3,174,717 | A | 3/1965 | Bray ....................... 251/230 |
| 3,537,473 | A * | 11/1970 | Dezurik, Jr. .............. 137/556.6 |
| 3,586,288 | A | 6/1971 | Gulich et al. ............. 280/763.1 |
| 4,093,178 | A * | 6/1978 | Hughes et al. ............. 251/104 |
| 4,205,820 | A | 6/1980 | Bray ....................... 251/94 |
| 4,407,483 | A * | 10/1983 | Gachot ..................... 251/287 |
| 4,483,512 | A | 11/1984 | Drapeau ................... 251/265 |
| 4,518,008 | A | 5/1985 | Fenster et al. .............. 137/552 |
| 4,682,755 | A | 7/1987 | Bernstein et al. ............ 251/4 |
| 4,747,427 | A * | 5/1988 | Smith et al. ................ 137/270 |
| 4,844,116 | A | 7/1989 | Buehler et al. ............. 137/360 |
| 4,854,344 | A | 8/1989 | Schnipke .................... 137/606 |
| 4,944,325 | A * | 7/1990 | Baldwin et al. ............. 137/375 |
| 5,069,249 | A | 12/1991 | Ostertag et al. ............ 137/625.4 |
| 5,579,804 | A * | 12/1996 | Roberts .................... 137/385 |
| 5,647,389 | A | 7/1997 | Holloway ................... 137/15 |
| 5,829,734 | A | 11/1998 | Freudendahl ............... 251/267 |
| 6,347,783 | B1 | 2/2002 | Prasser et al. .............. 251/64 |
| 6,959,909 | B2 * | 11/2005 | Bancroft et al. ............ 251/109 |

FOREIGN PATENT DOCUMENTS

| | | |
|---|---|---|
| JP | 10110455 | 4/1998 |
| WO | WO02/061310 | 8/2002 |

\* cited by examiner

*Primary Examiner*—John K Fristoe, Jr.
(74) *Attorney, Agent, or Firm*—Synnestvedt & Lechner LLP

(57) ABSTRACT

A valve actuator is disclosed for use with short throw valves. The actuator includes a plate perpendicular to the valve stem that has a slot formed of regions having different radii of curvature centered on the valve stem. An eccentric cam is attached to a handle mounted on the valve stem. The cam extends through the slot and is rotatable for positioning at a radius corresponding to the radius of the different slot regions. When the cam is rotated so that it may traverse a slot region, the handle can be turned to move the valve closing member through an angle subtended by the slot region. This permits the valve to be opened or closed in a step-wise fashion and prevents rapid opening and closing of the valve that can cause a water hammer effect.

21 Claims, 6 Drawing Sheets

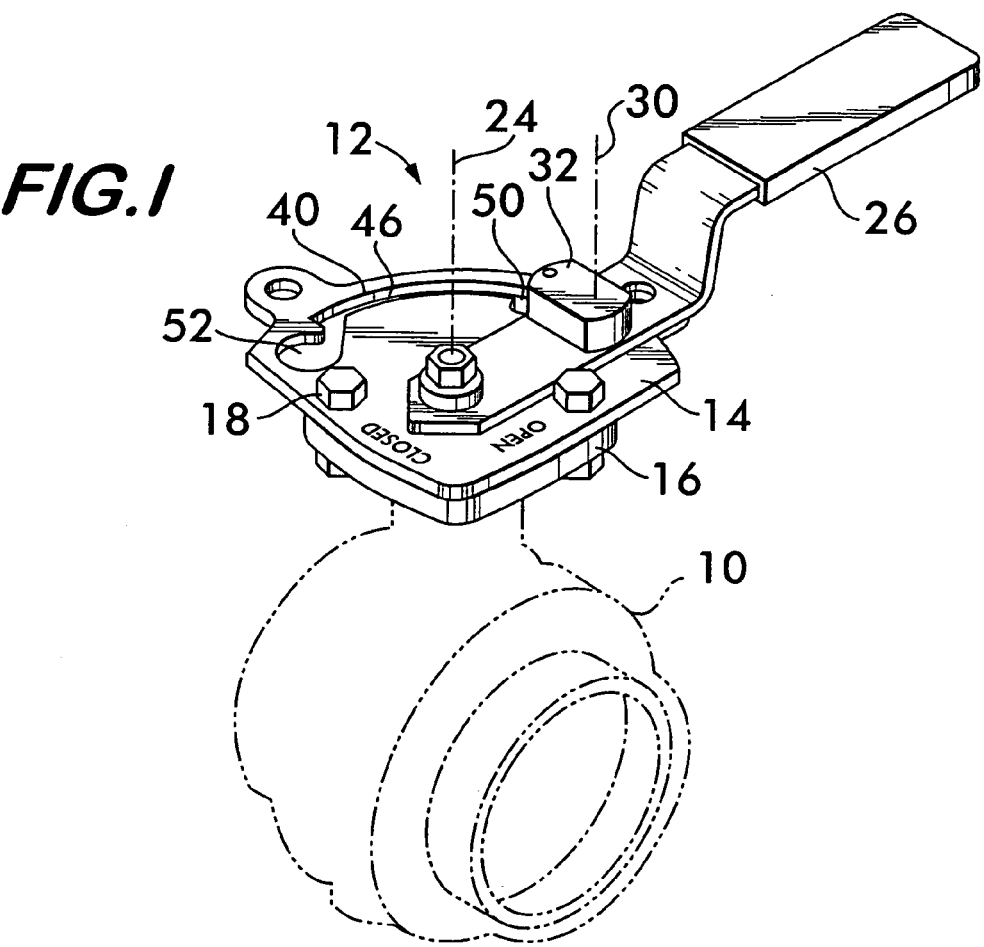
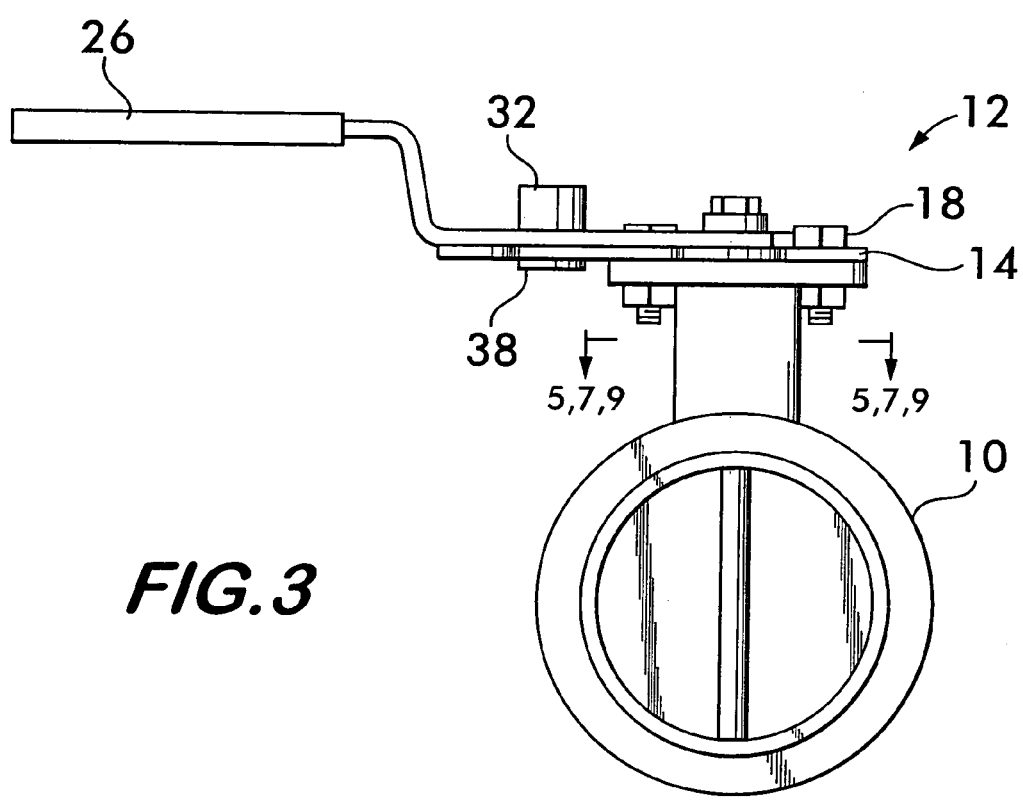

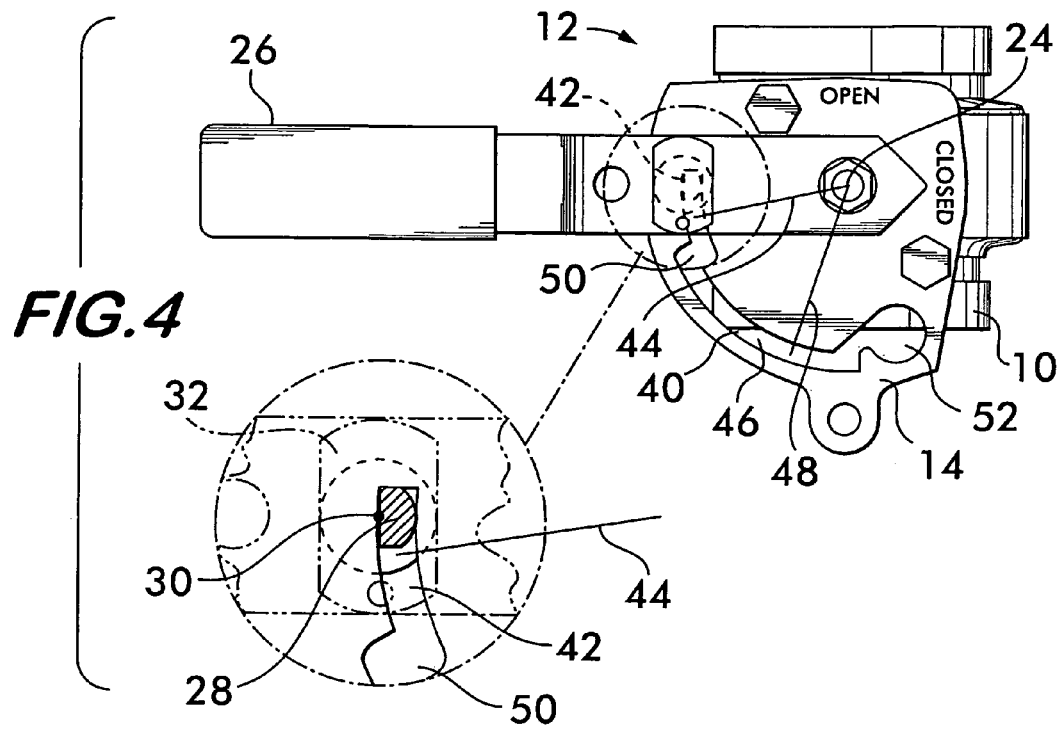
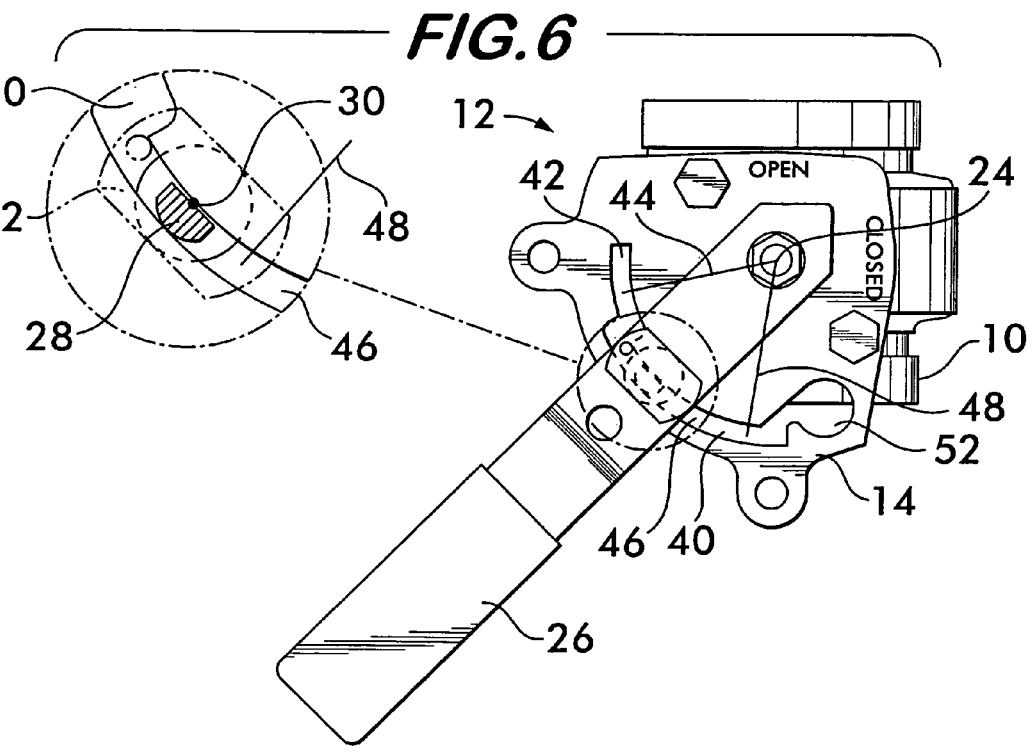

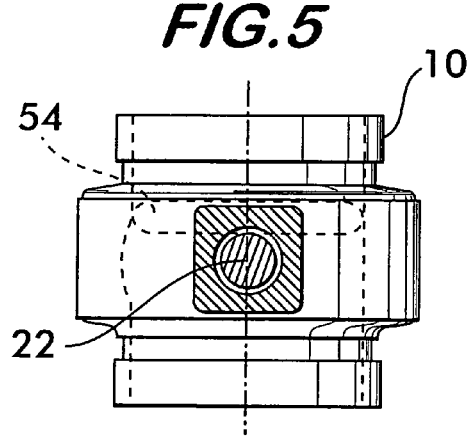
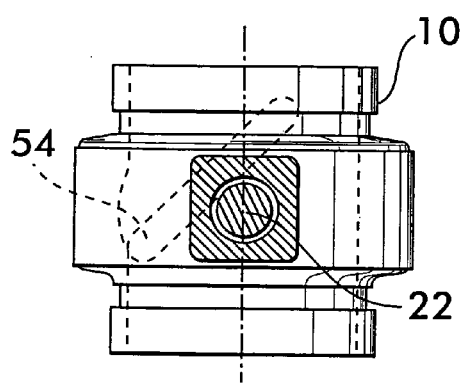
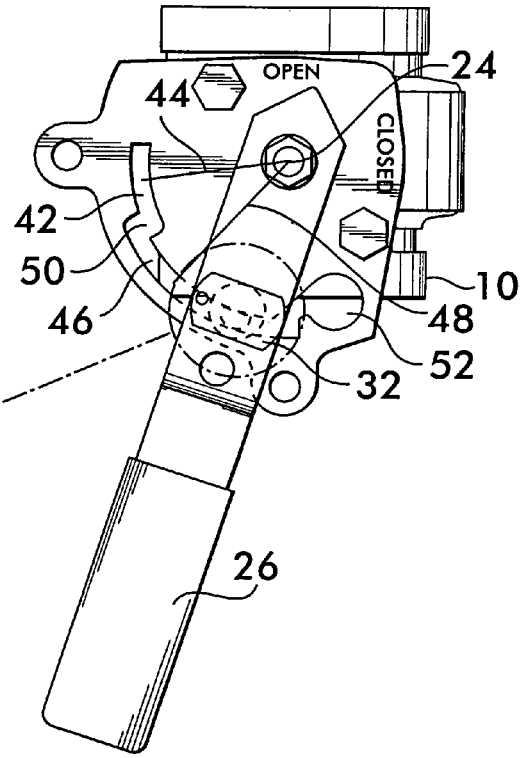

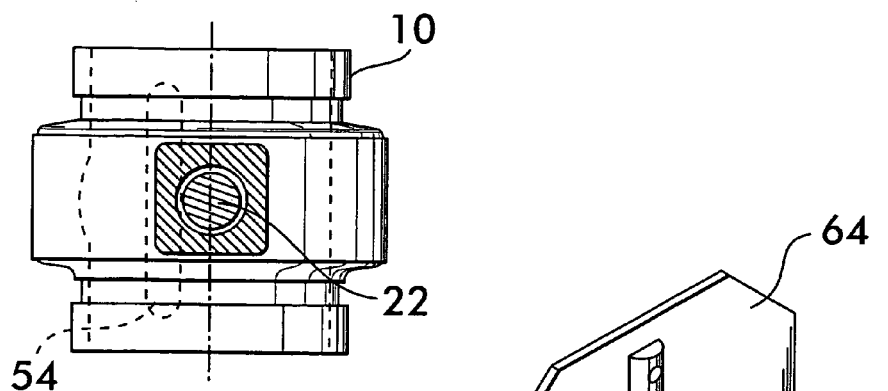
FIG. 9
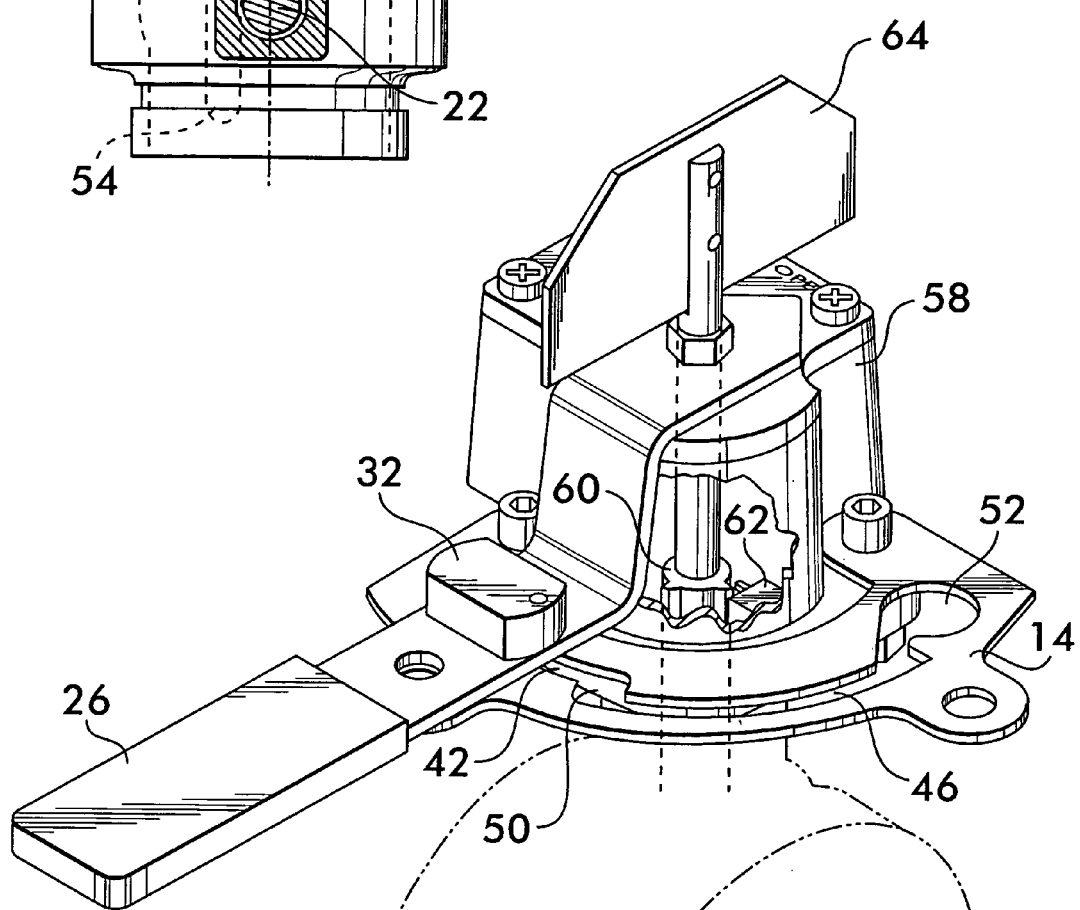
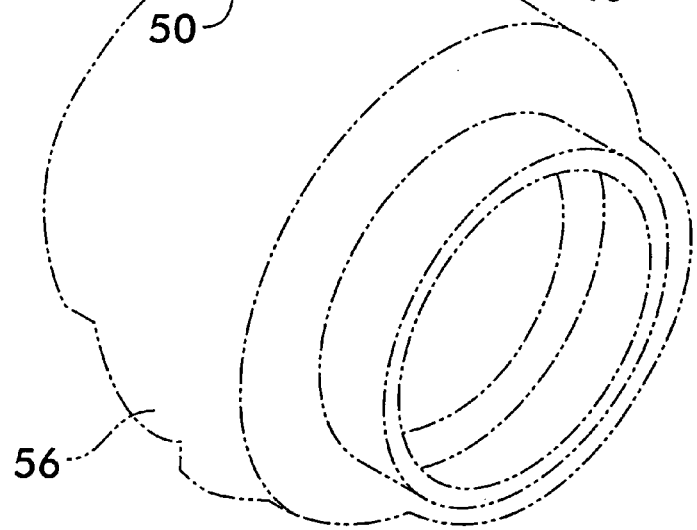
FIG. 10

SLOW CLOSING ACTUATOR AND VALVE

FIELD OF THE INVENTION

This invention relates to actuators for valves and especially to slow closing actuators for manual closing of short throw valves.

BACKGROUND OF THE INVENTION

Piping systems, such as those used to deliver water to fire suppression sprinkler systems, handle large liquid flow rates under significant pressure. The flow to the sprinkler system is controlled by one or more shut-off valves which may be, for example, slow closing gate valves each operated by a hand wheel turning a jackscrew. Slow closing valves are mandated for sprinkler applications by various specifications, such as those promulgated by Underwriters' Laboratories (UL) or Factory Mutual (FM) to prevent damage upstream of the valve due to the water hammer effect which will occur if a valve is closed rapidly. In pipes carrying high flow rates under significant pressure, the change in momentum caused by a sudden valve closing will generate high transient forces on the pipes which can cause their mountings to fail and the pipe to leak or rupture, thereby rendering the sprinkler system inoperative.

It is desirable to use short throw valves such as quarter-turn ball valves and butterfly valves to control water flow to a sprinkler system due to the simplicity and reliability of such valves. However, these valves are capable of very rapid closing and may cause significant damage to the piping system due to the water hammer effect when manually operated without constraint. To use short throw valves and avoid the water hammer problem, the valves have been modified, for example, by the addition of a multi-turn handle coupled with reduction gearing to prevent quick closing. Such modifications defeat the purpose of using simple quarter turn valves, however, as the modifications render the valves more complicated, more expensive and less reliable. There is clearly a need for a short throw valve that is operable in a manner that avoids the water hammer effect but maintains the simplicity and reliability inherent in such valves.

SUMMARY OF THE INVENTION

The invention concerns an actuator for a valve having a stem rotatable about a first axis of rotation. The actuator comprises a plate mountable on the valve. The plate is substantially perpendicular to the stem. A guide slot is positioned in the plate. The guide slot has a plurality of regions including at least a first slot region having a first radius of curvature, and a second slot region having a second radius of curvature. The second radius of curvature is different from the first radius. The actuator also has a handle mountable on the stem. A cam is mounted on the handle. The cam is rotatable about a second axis of rotation oriented substantially perpendicular to the plate. The cam is eccentric to the second axis of rotation and extends through the guide slot. The cam may be rotated to a first orientation positioning the cam at the first radius thereby permitting the handle to be turned along an arc traversing the first slot region. Further rotation of the cam to a second orientation positions the cam at the second radius thereby permitting the handle to be turned along an arc traversing the second slot region. In one embodiment, the guide slot is formed of only two slot regions.

The guide slot also includes a radially extending slot region connecting the first and the second slot regions to one another. The cam is rotatable within the radially extending slot region between the first and the second positions to position it at either one of the first or second radii for traversing one of the first or second slot regions. Preferably, the radially extending slot region is positioned between adjacent ends of the first and second slot regions.

In one embodiment, the first slot region has a shorter arc length than the second slot region. In this embodiment, the valve is preferably in the closed configuration when the cam is positioned at the end of the first slot region that is positioned distal to the second slot region.

BRIEF DESCRIPTION OF THE DRAWINGS

FIG. 1 is a perspective view of a valve having an actuator according to the invention;

FIG. 3 is an end view of the valve shown in FIG. 1;

FIGS. 4, 6 and 8 are top views showing operation of the actuator shown in FIG. 1;

FIGS. 5, 7 and 9 are sectional views taken, respectively, at lines 5-5, 7-7 and 9-9 of FIG. 3 showing the position of the valve closing member corresponding respectively, to the positions of the valve actuator shown in FIGS. 4, 6 and 8; and FIG. 10 is a perspective view of another embodiment of a valve having an actuator according to the invention.

DETAILED DESCRIPTION OF THE EMBODIMENTS

FIG. 1 shows a valve 10 on which is mounted an actuator 12 according to the invention. Valve 10 (shown in phantom line) is a short throw valve, such as a ball valve or a butterfly valve, which requires only a quarter turn (a rotation of 90°) of the valve closing member to fully open or close the valve.

Figure 2:
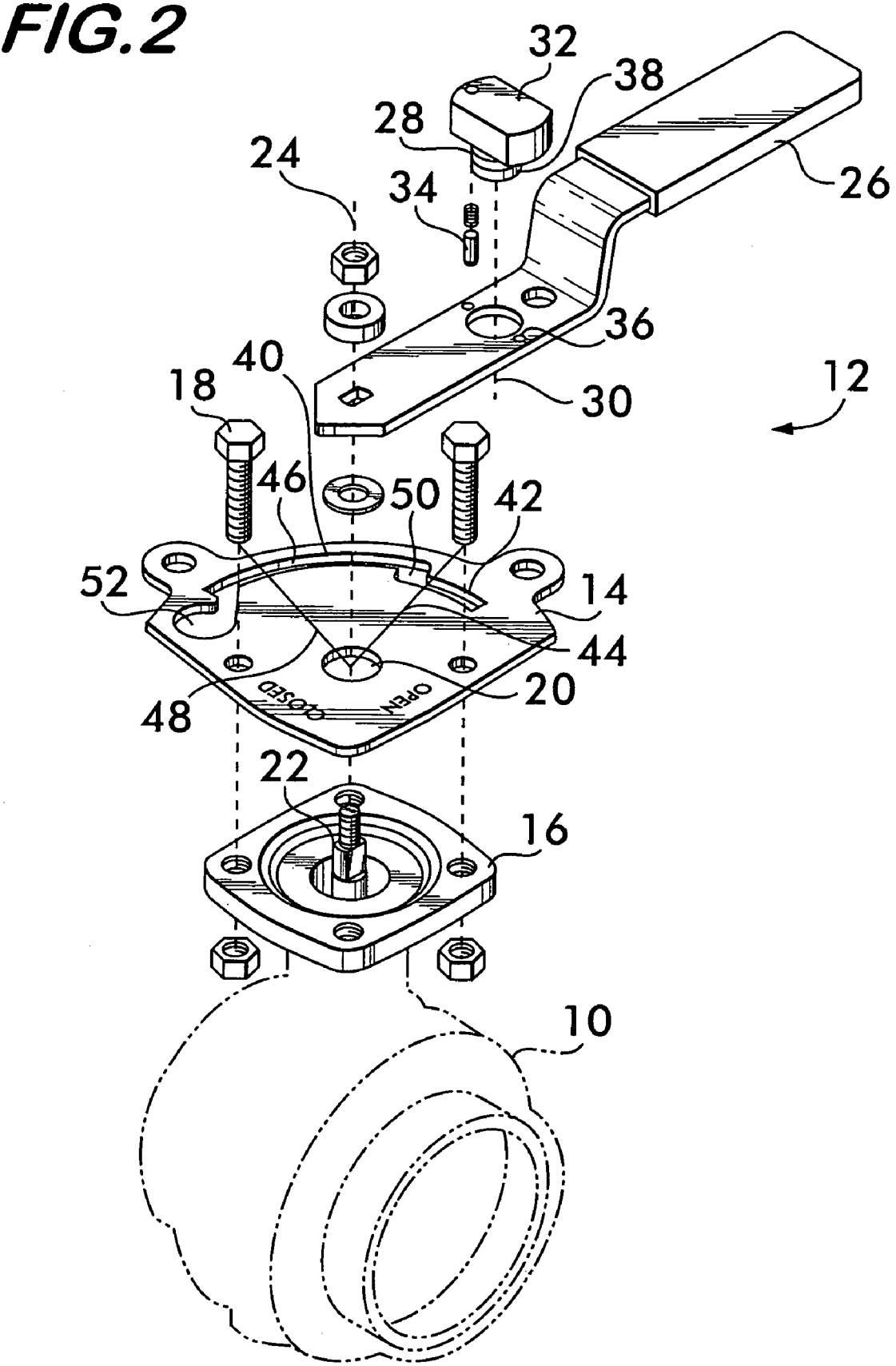
FIG. 2 is an exploded perspective view of the valve shown in FIG. 1.

As best shown in the exploded view of FIG. 2, actuator 12 comprises a plate 14 that is mounted on a flange 16 of the valve 10 by fasteners such as bolts 18. A hole 20 in the plate allows a valve stem 22 to pass through. Valve stem 22 and plate 14 are oriented substantially perpendicular to one another. The valve stem is connected to a valve closing member (described in detail below) and is rotatable about an axis of rotation 24 to rotate the valve closing member between open and closed positions. A handle 26 is attached to the valve stem 22 to permit manual turning about axis 24. The handle may be attached to the valve stem using an elongated aperture 25 as explained in detail below.

A cam 28 is mounted on the handle 26. The cam is rotatable about another axis of rotation 30 which is also oriented substantially perpendicular to the plate 14. A turning knob 32 is attached to the cam for rotating it about axis 30. Knob 32 has a detent mechanism 34 that cooperates with indentations 36 in the handle 26 to fix the rotational position of the cam about axis 30. A retaining head 38 is attached to an end of cam 28 opposite the knob 32. As shown in FIGS. 1 and 3, when the actuator 12 is properly assembled, the cam 28 extends through a guide slot 40 positioned in the plate 14. The knob 32 rides on handle 26 above the upper face of plate 14 and the retaining head 38 engages the bottom face of the plate. The retaining head 38 is sized larger than the width of the guide slot to prevent the cam from being pulled out of the guide slot.

Guide slot 40 is formed of a plurality of slot regions differentiated by their respective radii of curvature. The radius of curvature of each slot region is centered on the axis of rotation 24 of the valve stem. In the example actuator shown in FIG. 2, guide slot 40 is formed of two slot regions, region 42, having a radius of curvature 44, and region 46, having a radius of curvature 48 greater than radius 44. It is also noted that the arc length of slot region 42 is smaller than the arc length of slot region 46 for reasons described in detail below.

The slot regions 42 and 46 are connected to one another by a radially extending slot region 50. Guide slot 40 may also have an enlarged slot region 52 positioned at one end. The enlarged slot region is sized to permit the retaining head 38 to pass through the plate 14, allowing assembly and disassembly of the actuator 12. It is also feasible to make the retaining head 38 removable from the cam 28, by attaching it to the cam by screw threads for example. If the retaining head is removable then there is no need for the enlarged slot region 52.

Figure 2A:
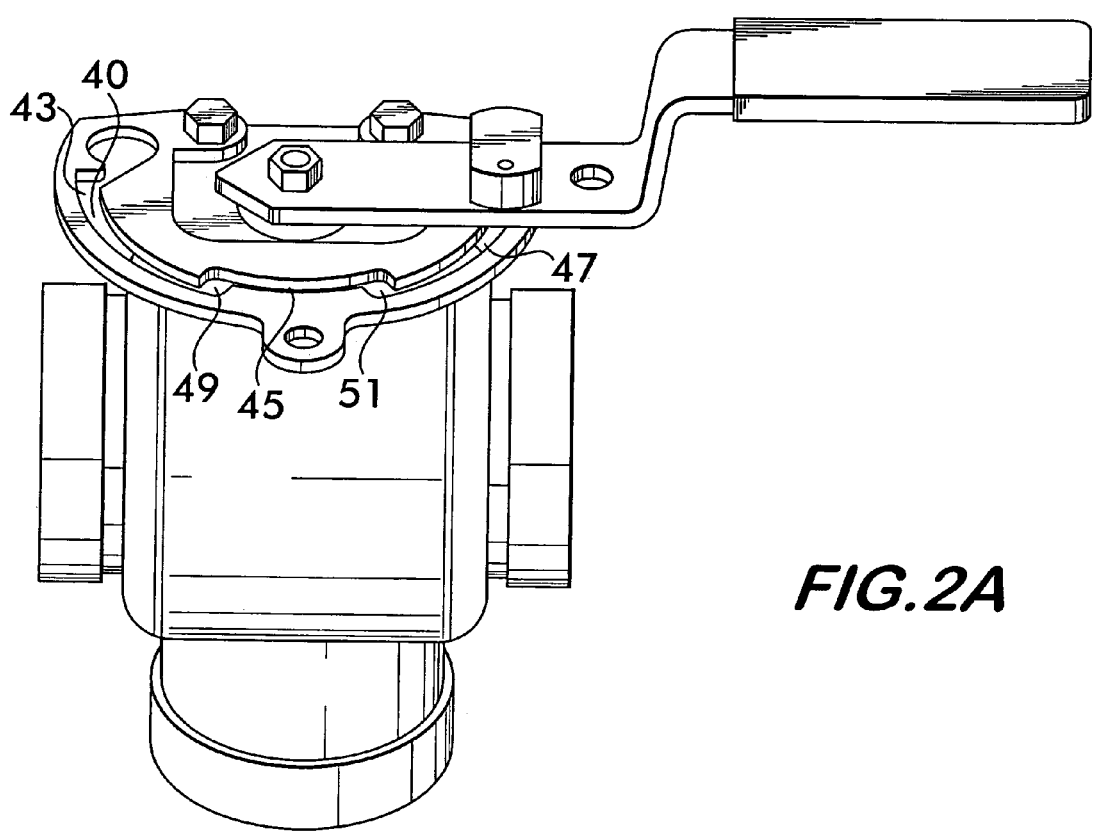
FIG. 2A is a perspective view of a diverter valve having another embodiment of an actuator according to the invention.

In another embodiment, shown in FIG. 2A, guide slot 40 is formed of three slot regions 43, 45 and 47. The three slot regions are connected to one another by two radially extending slot regions 49 and 51. Slot regions 43, 45 and 47 subtend an angle of about 180 degrees and such configurations are used with valves having a longer throw, such as diverted valves which may be closed or opened to a first or a second outlet.

As best shown in FIG. 4, the cam 28 is positioned eccentrically to its axis of rotation 30. Rotation of the cam about axis 30 thus moves the cam toward and away from the axis of rotation 24 of valve stem 22, allowing the cam to be positioned at different radii of curvature corresponding to the respective radii 44 and 48 of the slot regions 42 and 46. Rotation of handle 26 is constrained by the position of cam 28, which is used in conjunction with guide slot 40 to control the speed at which the valve is opened and closed as described below.

The description of operation of the actuator 12 begins with FIGS. 4 and 5. FIG. 4 shows the handle 26 in the closed position, and FIG. 5 shows the valve closing member 54 (in this example, a plate of a butterfly valve) in the closed position corresponding to the aforementioned handle position. The enlarged view of FIG. 4 shows the cam 28 rotated about its axis 30 so that it is positioned at a radius 44 from the axis of rotation 24 corresponding to the radius of slot region 42. With the cam in this position, the handle 26 may be turned counter clockwise toward the open position, but only over the limited angle subtended by the slot region 42. The cam 28 traverses the slot region 42 and is stopped by contact with the radially extending guide slot region 50. The arc length of the slot region 42 is purposely limited so that the valve closing member 54 is only opened a small amount, calibrated to prevent a significant surge of water from passing rapidly through the valve and thereby avoiding the water hammer effect.

With water now flowing through the valve at a controlled rate, the cam 28 is rotated within the radially extending guide slot region 50 by turning knob 32 so that the cam is positioned at the larger radius 48, corresponding to the radius of curvature of slot region 46. As shown in FIG. 6, this position of the cam allows it to traverse the slot region 46, thereby allowing the handle 26 to be turned through an angle subtended by this slot region to further open the valve as shown in FIG. 7. In this example, the arc length of the slot region 46 allows the valve to be opened fully when the cam 28 traverses the entire length of the slot region, as shown in FIGS. 8 and 9. It is understood that the guide slot 40 could be divided into more than two regions in order to further slow the opening and closing of the valve by requiring the motion of the valve closing member to be halted while the cam is rotated to the proper radius for a particular guide slot region.

To close the valve, handle 26 is rotated clockwise from the position shown in FIG. 8 with the cam 28 traversing slot region 46 as shown in FIG. 6 until it encounters the radially extending guide slot region 50 which prevents further rotation of the handle. With only a partial rotation of the handle being permitted, the valve closing member is prevented from closing fully and a severe water hammer effect is thus prevented. The motion of the valve closing member 54 is halted while cam 28 is rotated to position it at the radius 44 of the slot region 42. The handle may then be rotated further in the clockwise direction to complete the valve closing illustrated in FIGS. 4 and 5. Note that pausing the motion of the valve closing member with the valve in the partially open position limits the transient forces due to the change in flow rate and gives them time to settle out without a significant water hammer effect. After rotating the cam to position it at the radius 44 corresponding to slot region 42, the handle may be turned to complete closing of the valve without fear of damage to the pipe network because the flow rate at this point is small enough such that no matter how quickly the handle is moved, significant force from the water hammer effect will not occur.

FIG. 10 shows a ball valve 56 having the actuator 12 according to the invention. Valve 56 is also a supervised valve in that it has within a weatherproof cover 58 a cam 60 that rotates with the valve stem. The cam 60 interacts with a sensor 62, for example, a switch, which generates a signal indicative of the status of the valve. For example, the cam may close the switch when the valve is in the open position, and the switch may be used to control a lamp on a control panel, an illuminated lamp indicating that the valve is open, an unlit lamp indicating that the valve is closed or vice versa. Other configurations are also feasible using multiple cams and switches to further define the state of the valve. Additionally, the valve may have a visual indicator, such as plate 64 that is attached to the valve stem and rotates with it. The orientation of the plate indicates the status of the valve. When the plane of the plate is perpendicular to the flow direction as shown in FIG. 10, the valve is closed. When the plane of the plate is aligned with the flow direction, the valve is open.

Valve actuators according to the invention, when used on short throw valves such as ball valves and butterfly valves, prevent damage due to the water hammer effect by controlling the manner in which the valves are opened and closed. This allows such valves to be used in applications for which they were previously considered unsuitable without sacrificing the advantages of simplicity and reliability inherent in their design.

What is claimed is:

1. An actuator for a valve having a stem rotatable about a first axis of rotation, said actuator comprising:
    a plate mountable on said valve substantially perpendicular to said stem;
    a guide slot positioned in said plate, said guide slot having a plurality of regions including at least a first slot region having a first radius of curvature and a second slot region having a second radius of curvature different from said first radius;
    a handle mountable on said stem; and
    a cam mounted on said handle and rotatable about a second axis of rotation oriented substantially perpendicular to said plate, said cam being eccentric to said second axis of rotation and extending through said guide slot, wherein rotation of said cam to a first orientation positions said cam at said first radius thereby permitting said handle to be turned along an arc traversing said first slot region, further rotation of said cam to a second orientation positioning said cam at said second radius thereby permitting said handle to be turned along an arc traversing said second slot region.

2. An actuator according to claim 1, wherein said guide slot is formed of only two said slot regions.

3. An actuator according to claim 1, wherein said guide slot further comprises a radially extending slot region connecting said first and said second slot regions to one another, said cam being rotatable within said radially extending slot region between said first and said second positions.

4. An actuator according to claim 3, wherein said radially extending slot region is positioned between adjacent ends of said first and second slot regions.

5. An actuator according to claim 1, further comprising:
   a knob attached to one end of said cam to facilitate rotation thereof;
   a retaining head attached to another end of said cam, said retaining head being sized larger than the width of said slot for engaging said plate and retaining said cam to said actuator; and
   an enlarged slot region sized larger than said retaining head to permit removal of said cam from said actuator.

6. An actuator according to claim 5, wherein said enlarged slot region is positioned at one end of said guide slot.

7. An actuator according to claim 1, wherein said first slot region has a shorter arc length than said second slot region.

8. An actuator according to claim 7, wherein said valve is in said closed configuration when said cam is positioned at an end of said first slot region distal to said second slot region.

9. A valve comprising:
   a stem rotatable about a first axis of rotation for opening and closing said valve;
   a plate mountable on said valve substantially perpendicular to said stem;
   a guide slot positioned in said plate, said guide slot having a plurality of regions including at least a first slot region having a first radius of curvature and a second slot region having a second radius of curvature different from said first radius, said radii having a common center substantially coincident with said first axis of rotation;
   a handle mounted on said stem for opening and closing said valve; and
   a cam mounted on said handle and rotatable about a second axis of rotation oriented substantially perpendicular to said plate, said cam being eccentric to said second axis of rotation and extending through said guide slot, wherein rotation of said cam to a first orientation positions said cam at said first radius thereby permitting said handle to be turned along an arc traversing said first slot region, further rotation of said cam to a second orientation positioning said cam at said second radius thereby permitting said handle to be turned along an arc traversing said second slot region.

10. A valve according to claim 9, wherein said guide slot is formed of three said slot regions.

11. A valve according to claim 9, wherein said guide slot further comprises a radially extending slot region connecting said first and said second slot regions to one another, said cam being rotatable within said radially extending slot region between said first and said second positions.

12. A valve according to claim 11, wherein said radially extending slot region is positioned between adjacent ends of said first and second slot regions.

13. A valve according to claim 9, wherein said guide slot further comprises:
   a knob attached to one end of said cam to facilitate rotation thereof;
   a retaining head attached to another end of said cam, said retaining head being sized larger than the width of said slot for engaging said plate and retaining said cam to said actuator; and
   an enlarged slot region sized larger than said retaining head to permit removal of said cam from said actuator.

14. A valve according to claim 13, wherein said enlarged slot region is positioned at one end of said guide slot.

15. A valve according to claim 9, wherein said first slot region has a shorter arc length than said second slot region.

16. A valve according to claim 15, wherein said valve is in said closed configuration when said cam is positioned at an end of said first slot region distal to said second slot region.

17. A valve according to claim 9, further comprising a sensor mounted on said valve, said sensor sensing the position of said stem and generating a signal indicative of the status of said valve being open or closed.

18. A valve according to claim 9, wherein said handle has a throw of about 90° to fully open or close said valve.

19. A valve according to claim 9, wherein said handle has a throw of about 180°.

20. A valve according to claim 9, wherein said stem is connected to a valve closing member comprising a ball.

21. A valve according to claim 9, wherein said stem is connected to a valve closing member comprising a plate.

* * * * *